US012646955B2

(12) United States Patent
Deng

(10) Patent No.: US 12,646,955 B2
(45) Date of Patent: Jun. 2, 2026

(54) CHARGING CIRCUIT AND INTEGRATED CIRCUIT

(71) Applicant: Silergy Semiconductor Technology (Hangzhou) LTD, Hangzhou (CN)

(72) Inventor: Pengwan Deng, Hangzhou (CN)

(73) Assignee: Silergy Semiconductor Technology (Hangzhou) LTD., Hangzhou (CN)

( * ) Notice: Subject to any disclaimer, the term of this patent is extended or adjusted under 35 U.S.C. 154(b) by 573 days.

(21) Appl. No.: 17/460,473

(22) Filed: Aug. 30, 2021

(65) Prior Publication Data

US 2022/0085624 A1     Mar. 17, 2022

(30) Foreign Application Priority Data

Sep. 14, 2020     (CN) .......................... 202010959684.3

(51) Int. Cl.
*H02J 7/00*          (2026.01)
*H02J 7/56*          (2026.01)
*H02J 7/96*          (2026.01)

(52) U.S. Cl.
CPC .................. *H02J 7/56* (2026.01); *H02J 7/96* (2026.01); *H02J 2207/20* (2020.01)

(58) Field of Classification Search
CPC .... H02J 7/0019; H02J 7/0013; H02J 2207/20; H02J 7/342; H02J 7/007182
See application file for complete search history.

(56) References Cited

U.S. PATENT DOCUMENTS

| | | | |
|---|---|---|---|
| 6,005,780 A | 12/1999 | Hua | |
| 6,580,258 B2 | 6/2003 | Wilcox et al. | |
| 9,325,254 B2 | 4/2016 | Deng et al. | |
| 9,331,588 B2 | 5/2016 | Chen | |
| 9,488,680 B2 | 11/2016 | Xu | |
| 11,489,357 B2 | 11/2022 | Chang | |
| 2004/0108835 A1* | 6/2004 | Kim ...................... | H02J 7/0013 |
| | | | 320/125 |
| 2012/0109442 A1* | 5/2012 | Kato ..................... | H02J 7/0024 |
| | | | 701/22 |
| 2014/0078789 A1 | 3/2014 | Li et al. | |
| 2014/0239934 A1 | 8/2014 | Zhang | |
| 2015/0036250 A1* | 2/2015 | Xiang ................. | H02J 7/00308 |
| | | | 361/78 |
| 2015/0160270 A1 | 6/2015 | Shi et al. | |
| 2015/0280578 A1 | 10/2015 | Huang et al. | |

(Continued)

*Primary Examiner* — Julian D Huffman
*Assistant Examiner* — Sadia Kousar

(57)          ABSTRACT

A charging circuit can include: a first input terminal for receiving an input signal; a first switching circuit coupled between the first input terminal and a first battery; a second switching circuit coupled between the first input terminal and a second battery; a bidirectional buck-boost circuit coupled between the first input terminal and a main battery; where when an external power supply is connected, the input signal respectively charges the first battery and the second battery through the first and second switching circuits, and charges the main battery through the bidirectional buck-boost circuit; and where when an external power supply is not connected, the main battery charges the first battery through the bidirectional buck-boost circuit and the first switching circuit, and charges the second battery through the bidirectional buck-boost circuit and the second switching circuit.

20 Claims, 3 Drawing Sheets

(56)        References Cited

U.S. PATENT DOCUMENTS

2015/0291052 A1 *  10/2015  Nakazawa ............. B60R 16/03
                                                        320/101
2020/0059106 A1 *   2/2020  Karlsson ............. H01M 10/425
2020/0119581 A1 *   4/2020  Kim ...................... H02J 7/0068
2021/0252996 A1 *   8/2021  Jang ........................ B60R 16/03
2021/0376741 A1 *  12/2021  Escudero Rodriguez ...................
                                                        H02M 3/33573

* cited by examiner

CHARGING CIRCUIT AND INTEGRATED CIRCUIT

RELATED APPLICATIONS

This application claims the benefit of Chinese Patent Application No. 202010959684.3, filed on Sep. 14, 2020, which is incorporated herein by reference in its entirety.

FIELD OF THE INVENTION

The present invention generally relates to the field of power electronics, and more particularly to charging circuits and associated integrated circuits.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
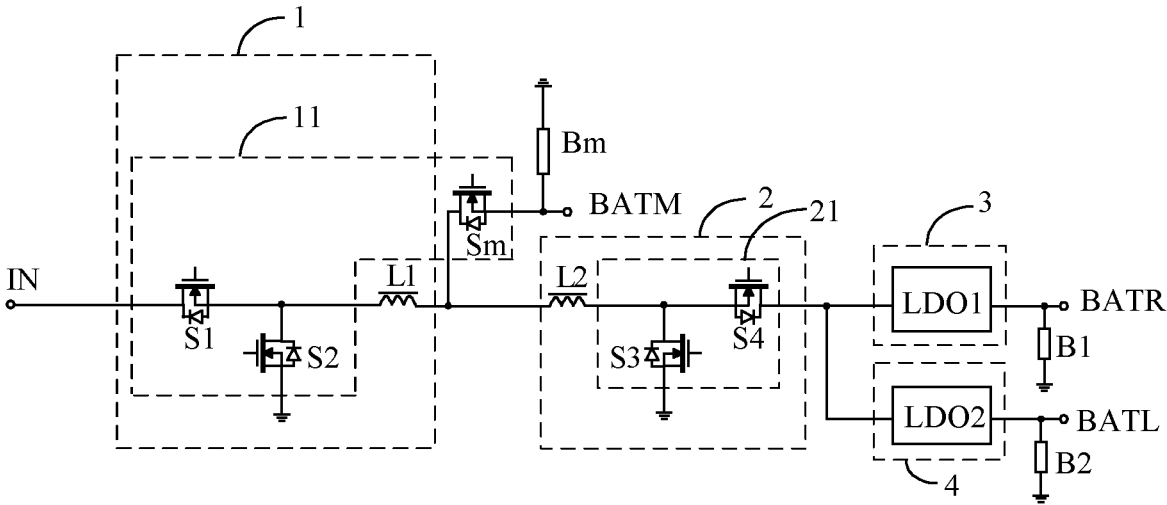
FIG. 1 is a schematic circuit diagram of an example charging circuit.

With the further demand of consumers for headset functions, the types of headsets are increasingly updated, and the introduction and use of new headsets, particularly the widespread use of true wireless stereo (TWS) headsets, put forward higher requirements for the charging circuit of headsets. An example charging circuit of an earphone is shown in FIG. 1. This example charging circuit can include buck circuit 1, boost circuit 2, and linear charging module 3. When the charging circuit is connected to an external power supply, buck circuit 1 may receive the input voltage Vin output by the wired power supply or the wireless power supply. Voltage Vin can charge main battery Bm of the earphone through buck circuit 1, and input voltage Vin can in turn charge batteries B1 and B2 through buck circuit 1, boost circuit 2, and linear charging module 3. When the charging circuit is not connected to an external power source, main battery Bm can sequentially charge batteries B1 and B2 through boost circuit 2 and linear charging module 3. Batteries B1 and B2 may respectively be located in the left and right earbuds, so the linear charging module 3 can include first and second linear charging modules that are respectively located in the left and right headsets. The voltage output by boost circuit 2 can charge batteries B1 and B2 through the first and second linear charging modules, respectively.

In this example, switching circuit 11 of buck circuit 1 can be integrated in a first chip, switching circuit 21 of boost circuit 2 can be integrated in a second chip, and the first linear charging module can be integrated in a third chip. The second linear charging module can be integrated in a fourth chip. That is, the charging circuit may require 4 chips and can include two inductors, L1 and L2. Therefore, the charging circuit of this example has a relatively large volume and high cost, while the charging efficiency and charging rate of the charging circuit are relatively low.

Figure 2:
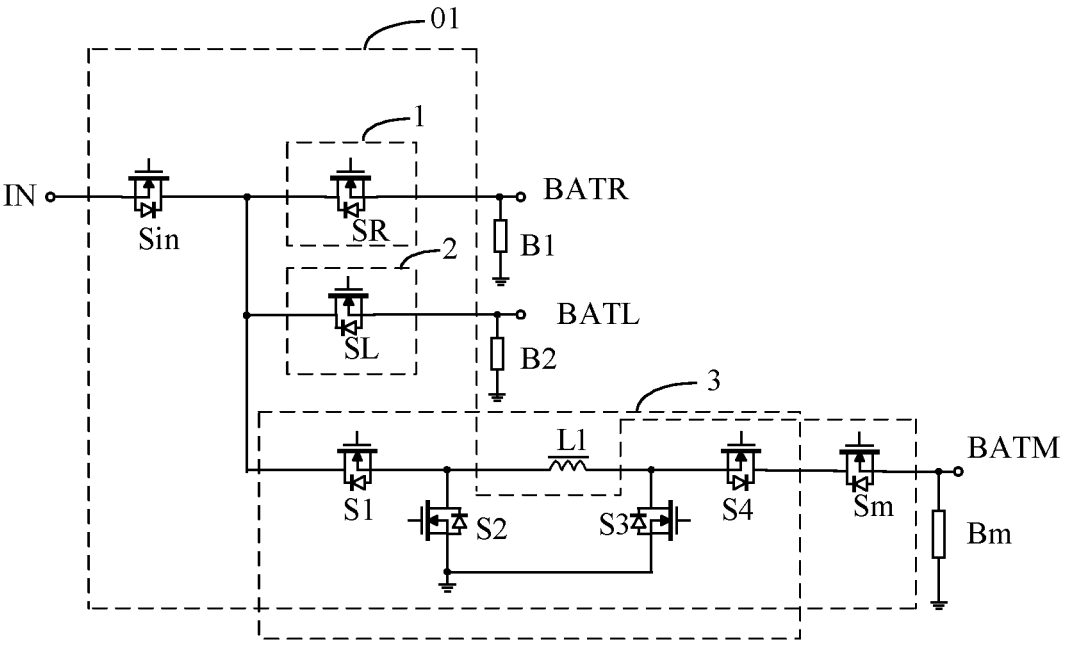
FIG. 2 is a schematic circuit diagram of a first example charging circuit, in accordance with embodiments of the present invention.

Referring now to FIG. 2, shown is a schematic circuit diagram of a first example of the charging circuit, in accordance with embodiments of the present invention. The charging circuit can include input terminal IN, switching circuit 1, switching circuit 2, and bidirectional buck-boost circuit 3. Input terminal IN can receive an input signal, switching circuit 1 may be coupled between input terminal IN and battery B1, and switching circuit 2 can be coupled between input terminal IN and battery B2. Bidirectional buck-boost circuit 3 can be coupled between input terminal IN and main battery Bm. When an external power supply is connected, the input signal can respectively charge batteries B1 and B2 through switching circuits 1 and 2, and can charge main battery Bm through bidirectional buck-boost circuit 3. When there is no external power supply, main battery Bm can charge battery B1 through bidirectional buck-boost circuit 3 and switching circuit 1, and can charge battery B2 through bidirectional buck-boost circuit 3 and switching circuit 2. When main battery Bm is charged, bidirectional buck-boost circuit 3 may operate in the forward direction. When main battery Bm is discharged, bidirectional buck-boost circuit 3 may operate in the reverse direction.

The input signal can be an output signal of a power supply, and the power supply may be a wired power supply or a wireless power supply. Further, when the power supply is a wired power supply, the power supply may receive a signal in the form of a universal serial bus (USB), and can provide the input signal. When the power supply is a wireless power supply, the power supply can include a power transmitting terminal and a power receiving terminal, and the power transmitting terminal may receive the wireless input signal, and output the input signal through the power receiving terminal. In one example, the output voltage of the power supply may be fixed. In another example, the output signal of the power supply can be adjustable. The power supply may have a control circuit for controlling the input signal output by the power supply.

Bidirectional buck-boost circuit 3 can include power switches S1, S2, S3, and S4, and inductor L1. Power switches S1 and S2 can connect in series between the first port of the bidirectional buck-boost circuit. Power switches S4 and S3 can connect in series between the second port of the bidirectional buck-boost circuit and the ground, and one end of inductor L1 can connect to the common terminal of power switches S1 and S2. The other end of inductor L1 can connect to the common terminal of power switches S3 and S4. For example, the high potential terminal of the first port of the bidirectional buck-boost circuit can connect to the common terminal of switching circuits 1 and 2 and input terminal IN, and its low potential terminal may be grounded. The high potential terminal of the second port of the bidirectional buck-boost circuit can be coupled to main battery Bm, and its low potential terminal may be grounded.

In this example, when an external power supply is connected, the input signal can charge battery B1 through switching circuit 1, and the input signal can charge battery B2 through switching circuit 2. When an external power supply is connected, the input signal can charge batteries B1 and B2 through a first-stage circuit (e.g., switching circuit 1 or switching circuit 2), and the charging efficiency at this time may be equal to the efficiency of switching circuit 1 or the efficiency of switching circuit 2. In some examples, the input signal can charge batteries B1 and B2 through three-stage circuits (e.g., a buck circuit, a boost circuit, and a linear charging module). The charging efficiency can be equal to the product of the efficiency of the buck circuit, the efficiency of the boost circuit, and the efficiency of the linear charging module, in this case The efficiency of each circuit or module can be less than 1, and the efficiency of switching circuit 1 or switching circuit 2 may be greater than or equal to the efficiency of the linear charging module. Thus, the charging efficiency in particular embodiments can be higher than in other approaches.

There can be two ways for the input signal to respectively charge batteries B1 and B2 through switching circuits 1 and 2. In a first implementation, when an external power supply is connected, switching circuits 1 and 2 may operate in a linear state to charge batteries B1 and B2 respectively. Further, the resistance of switching circuit 1 can be controlled by controlling the voltage of the control terminal of switching circuit 1 to adjust the voltage of battery B1 and the current flowing through switching circuit 1. The resistance of switching circuit 2 can be controlled by controlling the voltage of the control terminal of switching circuit 2 to adjust the voltage of battery B2 and the current flowing through switching circuit 2. In this implementation, the input signal can be an output signal of a power supply with a fixed output voltage, or an output signal of a power supply with an adjustable output signal.

In addition, the input signal can charge main battery Bm through bidirectional buck-boost circuit 3. In the first implementation, if the input signal is an output signal of a power supply with a fixed output voltage, bidirectional buck-boost circuit 3 may operate in the buck mode in the forward direction. For example, power switch S4 can be turned on, power switch S3 is turned off, and power switches S1 and S2 may operate in a pulse-width modulation (PWM) state, such that power switches S1 and S2, and inductor L1 operate in a buck status. In addition, bidirectional buck-boost circuit 3 can be replaced by a bidirectional buck circuit (e.g., a buck circuit in the forward direction and a boost circuit in the reverse direction), and the bidirectional buck circuit may operate in a forward buck state. If the input signal is an output signal of a power supply with an adjustable output signal, bidirectional buck-boost circuit 3 may operate in the buck-boost state in the forward direction. For example, power switches S1, S2, S3, and S4 may operate in the PWM mode/state. By controlling the duty cycle of power switches S1, S2, S3, and S4, the bidirectional buck-boost circuit may operate in a boost or buck mode to charge main battery Bm.

In the second implementation, when an external power supply is connected, battery B1 and/or battery B2 can be charged in a constant current mode first for fast charging. In the constant current mode of particular embodiments, the battery can be charged with a constant current. When the voltage of battery B1 and/or battery B2 reaches the corresponding reference voltage, batteries B1 and B2 may be charged in a constant voltage mode. In the constant voltage mode of particular embodiments, the battery can be charged with a constant voltage. In this implementation, the input signal can be an output signal of a power supply with an adjustable output signal. Further, the input signal can include an input voltage and an input current. When battery B1 and/or battery B2 is charged in the constant current mode, the input current may be constant and the input voltage gradually can increase. When batteries B1 and B2 are charged in the constant voltage mode, the input voltage may be constant and the input current can be gradually decreased.

Further, when battery B1 and/or battery B2 are charged with a constant current, the input voltage can increase with the increase of the voltage of battery B1 or battery B2. For example, the input voltage may be equal to the sum of the voltage of battery B1 or battery B2 and the corresponding voltage drop across the circuit when switching circuit 1 or switching circuit 2 is conducting. That is, the input voltage can be equal to the sum of the voltage of battery B1 and the voltage drop across the circuit when switching circuit 2 is conducting, or the input voltage can be equal to the sum of the voltage of battery B2 and the voltage drop across the circuit when switching circuit 2 is conducting.

If the voltage of battery B1 and the voltage of battery B2 are not much different, then when the input current is constant and the input voltage gradually increases, batteries B1 and B2 can be charged in the constant current mode, and switching circuits 1 and 2 may both operate in the conducting state. Also, when the input voltage is constant and the input current is gradually reduced, batteries B1 and B2 can be charged in the constant voltage mode, and switching circuits 1 and 2 may operate in a linear state.

For example, when the voltage of battery B1 and the voltage of battery B2 are not much different, the input current can be constant, and when the input voltage gradually increases, batteries B1 and B2 may be charged in the constant current mode. Also, switching circuits 1 and 2 may operate in a conducting state, and the input voltage can increase with the increase of voltage of battery B1 or battery B2. For example, the input voltage may be equal to the sum of the voltage of battery B1 or battery B2 and its corresponding voltage drop across the circuit when switching circuit 1 or switching circuit 2 is conducting. Also, when the voltage of the battery B1 or the voltage of battery B2 reaches the corresponding reference voltage, the input voltage can be constant, and the input current may gradually decrease, batteries B1 and B2 may be charged in a constant voltage mode, and switching circuits 1 and 2 may operate in a linear state.

If the voltage of battery B1 and the voltage of battery B2 are significantly different, the increase of the input voltage can include the following situations. First, the input voltage may gradually increase with the voltage of the higher battery between batteries B1 and B2. When the input voltage gradually increases and the input current is constant, the input voltage may gradually increase with the higher voltage between those two batteries, and batteries B1 and B2 can be charged in a constant current mode. The switching circuit corresponding to the battery with higher voltage may operate in the conducting state. The switching circuit corresponding to the battery with the lower voltage may enter a linear state, in order to prevent excessive charging current from causing battery overshoot. Further, the switching circuit corresponding to the battery with the lower voltage may operate in the linear state, or first operate in the linear state, and then operate in the conducting state. When the input voltage is constant and the input current gradually decreases, batteries B1 and B2 can be charged in a constant voltage mode. In addition, switching circuits 1 and 2 may operate in a linear status. For example, the input voltage can be equal to the sum of the higher voltage between battery B1 or battery B2 and the corresponding voltage drop across the circuit when switching circuit 1 or switching circuit 2 is in a conducting state.

For example, when the voltage of battery B1 and the voltage of battery B2 are significantly different, the input voltage can be controlled to gradually increase, the input current is constant, and the input voltage may gradually increase along with the higher voltage between batteries B1 and B2, and batteries B1 and B2 can be charged in the constant current mode. In the interval where the input current is constant and the input voltage gradually increases, the switching circuit corresponding to the battery with the higher voltage may operate in the conducting state, and the switching circuit corresponding to the battery with the lower voltage may operate in a liner state, until the voltage difference between batteries B1 and B2 is not substantially large (e.g., the voltage difference between batteries B1 and B2 reaches a first threshold), and the switching circuit corresponding to the lower battery may operate in the conducting state. If the voltage difference between batteries B1 and B2 is relatively large in the interval where the input current is constant and the input voltage is gradually increasing (e.g., the voltage difference between batteries B1 and B2 does not reach the first threshold in this interval), the switching circuit corresponding to the battery with the lower voltage may operate in a linear state. The input voltage can gradually increase, and when the voltage of the battery with the higher voltage reaches a first reference voltage, the input voltage can be controlled to be constant, batteries B1 and B2 may be charged in the constant voltage mode, and switching circuits 1 and 2 may operate in a linear state.

Second, the input voltage may gradually increase with the voltage of the lower battery between batteries B1 and B2. When the input current is constant and the input voltage gradually increases along with the lower voltage between batteries B1 and B2, the battery with the lower voltage may operate in a constant current mode. In the interval where the input current is constant and the input voltage gradually increases, the switching circuit corresponding to the battery with the lower voltage may operate in the conducting state during this interval. If the input voltage is initially higher than the higher voltage between B1 and B2, the battery with the higher voltage between B1 and B2 may operate in a linear state (e.g., the battery with the higher voltage is not charged with constant current at this time). Or, the battery with the higher voltage may operate first in the linear state (e.g., the battery with the higher voltage is not charged with constant current at this time), and then may operate in the conducting state (e.g., the battery with the higher voltage is charged with constant current at this time). If the input voltage is initially lower than the higher voltage between B1 and B2, the battery with the higher voltage between those two batteries may not operate first, then can operate in the conducting state (e.g., the battery with the higher voltage is charged with constant current at this time).

Alternatively, this battery may not operate first, and then may operate in a linear state (the battery with higher voltage is not charged with constant current at this time), or does not operate first, then operates in a linear state (e.g., the battery with higher voltage is not charged with constant current at this time), and then operates in the conducting state at last (e.g., the battery with the higher voltage is charged with constant current at this time). The input voltage can be controlled to be constant, and the input current may gradually be decreased, batteries B1 and B2 can be charged in a constant voltage mode, and switching circuits 1 and 2 may operate in a linear state. For example, the input voltage can be equal to the sum of the lower battery voltage of battery B1 or battery B2 and its corresponding voltage drop across the circuit when the corresponding switching circuit is in a conducting state.

For example, when the input current is constant, and the input voltage is increasing gradually with the increase of the voltage of the battery with lower voltage between batteries B1 and B2, the battery with the lower voltage may operate in a constant current mode. In the interval where the input current is constant and the input voltage gradually increases, the switching circuit corresponding to the battery with lower voltage may operate in the conducting state in this interval.

If the input voltage is initially higher than the voltage of the battery with higher voltage between batteries B1 and B2, the battery with the higher voltage may first operate in a linear state, and the battery with the higher voltage can be charged with non-constant current until the voltages of batteries B1 and B2 are not much different (e.g., the voltage difference between batteries B1 and B2 reaches the first threshold). Also, the switching circuit corresponding to the battery with higher voltage may operate in the conducting state, and the battery with the higher voltage can be charged with constant current. If the voltage difference between batteries B1 and B2 remains large in the interval where the input current is constant and the input voltage is gradually increasing (e.g., the voltage difference between batteries B1 and B2 does not reach the first threshold in this interval), then the switching circuit corresponding to the battery with the higher voltage between them may operate in a linear state in this interval.

If the input voltage is initially lower than the voltage of the battery with the higher voltage between batteries B1 and B2, the battery with the higher voltage may not operate first. When the input voltage increases to be greater than that of the battery with higher voltage, the switching circuit corresponding to the battery with the higher voltage may operate in a linear state, and the battery with the higher voltage may not be charged with a constant current until batteries B1 and B2 are not much different (e.g., the difference between the voltages of batteries B1 and B2 reaches the first threshold). Also, the switching circuit corresponding to the battery with the higher voltage can be in the conducting state, and the battery with the higher voltage may be charged with constant current. If the voltage difference between batteries B1 and B2 is large in the interval where the input current is constant and the input voltage is gradually increasing (e.g., the voltage difference between batteries B1 and B2 does not reach the first threshold in this interval), the switching circuit corresponding to the battery with the higher voltage may operate in a linear state when the input voltage increases to be greater than that of the battery with higher voltage.

Alternatively, the battery with the higher voltage may not operate until the voltage of the battery with the lower voltage rises to be not much different from the voltage of the battery with the higher voltage (e.g., the difference between batteries B1 and B2 reaches the first threshold), then the switching circuit corresponding to the battery with the higher voltage may operate in a conducting state, and the battery with the higher voltage can be charged with constant current. Also, the input voltage may gradually rise, and when the voltage of the battery with higher voltage reaches a second reference voltage, the input voltage can be controlled to be constant, batteries B1 and B2 can be charged in a constant voltage mode, and switching circuits 1 and 2 may operate in a linear state. For example, first and second reference voltages can be the same value, or different values, depending on the particular application.

Moreover, the second implementation is a fast charging process, and the charging rate at which batteries B1 and B2 are charged by the input signal may be higher in the second implementation than in other approaches. In addition, the input signal can charge main battery Bm through bidirectional buck-boost circuit 3. In the second implementation, since the input voltage gradually increases, the input voltage may be lower than the main battery voltage, and buck-boost circuit 3 may operate in the buck-boost state in the forward direction. For example, power switches S1, S2, S3, and S4 may operate in the PWM state. By controlling the duty cycle of power switches S1, S2, S3, and S4, the bidirectional buck-boost circuit may operate in a buck or boost mode to charge main battery Bm.

In this example, when there is no external power supply, bidirectional buck-boost circuit 3 may operate in a reverse direction, and main battery Bm can charge battery B1 through bidirectional buck-boost circuit 3 and switching circuit 1, and can charge battery B1 through bidirectional buck-boost circuit 3 and switching circuit 2. There can be three implementation approaches for main battery Bm to charge battery B1 or battery B2 through bidirectional buck-boost and switching circuits 1 or 2 as will be discussed below.

In the first implementation, when no external power supply is connected, bidirectional buck-boost circuit 3 may operate in reverse, and main battery Bm can generate a fixed voltage through bidirectional buck-boost circuit 3 to charge batteries B1 and B2. Here, switching circuits 1 and 2 may operate in a linear state. In the first implementation, bidirectional buck-boost circuit 3 can be replaced by a bidirectional buck circuit, and the bidirectional buck circuit may operate in a reverse boost state to generate a fixed voltage.

In the second implementation, when no external power supply is connected, bidirectional buck-boost circuit 3 may operate in reverse, and main battery Bm can charge batteries B1 and B2 in a time-sharing manner through bidirectional buck-boost circuit 3. Further, when there is no external power supply, main battery Bm can charge battery B1 in one switching cycle and battery B2 in the next switching cycle through bidirectional buck-boost circuit 3. Further, main battery Bm may store energy for inductor L1 during a part of a switching cycle, switching circuit 1 can operate in a conducting state during another part of a switching cycle, and inductor L1 may release energy to charge battery B1. Main battery Bm can store energy for inductor L1 during a part of the next switching cycle, switching circuit 2 may operate in a conducting state during another part of the next switching cycle, and inductor L1 may release energy to charge battery B2.

In the second implementation, the efficiency of charging batteries B1 and B2 by main battery Bm can be equal to that of the bidirectional buck-boost circuit. In other approaches, the efficiency of charging batteries B1 and B2 by main battery Bm may be equal to the product of the efficiency of the boost circuit and the efficiency of the linear charging module, so the charging efficiency of charging batteries B1 and B2 by main battery Bm in the second implementation of particular embodiments is higher than such other approaches. Moreover, when the voltage of battery B1 and the voltage of battery B2 are significantly different, batteries B1 and B2 can be charged in a time-sharing manner in this example, which is more advantageous than the technical scheme of charging batteries B1 and B2 at the same time. In this example, when batteries B1 and B2 are charged in a time-sharing manner, the voltage difference between batteries B1 and B2 may be large or small, while in the second implementation, the charging rate of batteries B1 and B2 by main battery Bm is higher than that in certain other approaches.

For example, during a part of a switching cycle, power switch S4 can be turned on, and power switch S2 may be turned on, such that main battery Bm stores energy for inductor L1. During another part of a switching cycle, power switch S1 can be turned on and power switch S3 may be turned on. Also, switching circuit 1 may operate in an conducting state so that battery B1 can be charged by inductor L1. In a part of the next switching cycle, power switch S4 can be turned on, and power switch S2 may be turned on, such that main battery Bm stores energy for inductor L1. In another part of the next switching cycle, power switches S1 and S3 can be turned on, and switching circuit 2 may operate in a conducting state, such that inductor L1 releases energy to charge battery B2.

In the third implementation, when no external power supply is connected, the second terminal of the bidirectional buck-boost circuit may receive the voltage of main battery Bm, and can generate a first voltage and a first current at its first terminal thereof to charge batteries B1 and B2. Further, battery B1 and/or battery B2 can be charged first in a constant current mode for fast charging. When the voltage of battery B1 and/or battery B2 reaches the corresponding reference voltage, batteries B1 and B2 can be charged in a constant voltage mode. Further, when battery B1 and/or battery B2 is charged in a constant current mode, the first current can be controlled to be constant, and the first voltage may be controlled to increase gradually. When batteries B1 and B2 are charged in a constant voltage mode, the first voltage can be controlled to be constant, and the first current may be controlled to decreased gradually.

Further, when battery B1 and/or battery B2 is charged in a constant current mode, the first voltage can increase with the increase of the voltage of battery B1 or battery B2. For example, the first voltage may be equal to the sum of the voltage of battery B1 or battery B2 and its voltage drop across the circuit when the corresponding switching circuit is in a conducting state. That is, the first voltage can be equal to the sum of the voltage of battery B1 and the voltage drop across the circuit when switching circuit 1 is conducting, or the first voltage can be equal to the sum of battery B2 and the voltage drop across the circuit when switching circuit 2 is conducting.

If the voltage of battery B1 and the voltage of battery B2 are not much different, then when the first current is constant and the first voltage gradually increases, batteries B1 and B2 can be charged in a constant current mode, and switching circuits 1 and 2 may both operate in a conducting state.

When the first voltage is constant and the first current is gradually decreased, batteries B1 and B2 can be charged in a constant voltage mode, and switching circuits 1 and 2 may both operate in a linear state.

For example, when the voltage of battery B1 and the voltage of battery B2 are not much different, the first current may remain constant, and when the first voltage gradually increases, batteries B1 and B2 can be charged in a constant current mode. Both switching circuits 1 and 2 may operate in a conducting state. The first voltage can increase with the increase of the voltage of battery B1 or battery B2. For example, the first voltage may be equal to the sum of the voltage of battery B1 or battery B2 and the voltage drop across the circuit when its corresponding switching circuit is conducting. When the voltage of battery B1 or the voltage of battery B2 reaches the corresponding reference voltage, the first voltage may remain constant, the first current may gradually decrease, batteries B1 and B2 can be charged in a constant voltage mode, and switching circuits 1 and 2 may operate in a linear state at this time.

If the voltage of battery B1 and the voltage of battery B2 are significantly different, the increase of the first voltage can include the following two situations. First, the first voltage can increase with the gradual increase of the voltage of the battery with higher voltage between batteries B1 and B2. When the first voltage gradually increases and the first current is constant, the first voltage may gradually increase with the voltage of the battery with the higher voltage, and batteries B1 and B2 can be charged in a constant current mode. Also, the switching circuit corresponding to the battery with the higher voltage may operate in the conducting state. The switching circuit corresponding to the battery with the lower voltage may enter a linear state, in order to prevent excessive charging current from causing battery overshoot. Further, the switching circuit corresponding to the battery with the lower voltage may operate in the linear state, or may operate in the linear state first, and then operate in the conductive state. When the first voltage is constant and the first current gradually decreases, batteries B1 and B2 can be charged in a constant voltage mode. Here, switching circuits 1 and 2 may operate in a linear state. For example, the first voltage can be equal to the sum of the battery voltage with the higher voltage and the voltage drop across the circuit when its corresponding switching circuit is conducting.

For example, when the voltage of battery B1 and the voltage of battery B2 are significantly different, the first voltage can be controlled to gradually increase, the first current may be constant, and the first voltage can increase with the higher battery voltage between batteries B1 and B1. Batteries B1 and B2 can be charged in a constant current mode. In the interval where the first current is constant and the first voltage gradually increases, the switching circuit corresponding to the battery with higher voltage may operate in the conducting state during this interval, and the switching circuit corresponding to the battery with the lower voltage may operate in a linear state until the voltage difference of batteries B1 and B2 are not much different (e.g., the voltage difference between batteries B1 and B2 reaches the first threshold). If the voltage difference between batteries B1 and B2 is large all the time in this interval (e.g., the voltage difference between batteries B1 and B2 does not reach the first threshold in this interval), the switching circuit corresponding to the battery with the lower voltage between them may operate in a linear state. If the first voltage rises gradually, and when the voltage of the battery with the higher voltage reaches the first reference voltage, the first voltage can be controlled to be constant, batteries B1 and B2 may be charged in a constant voltage mode, and switching circuits 1 and 2 may operate in a linear state.

Second, the first voltage can increase with the gradually increase of the voltage of the battery with the lower voltage between batteries B1 and B2. When the first current is constant, the first voltage may gradually increase with the voltage of the battery with the lower voltage between batteries B1 and B2, and the battery with the lower voltage between them may operate in a constant current mode. In the interval where the first current is constant and the first voltage gradually increases, the switching circuit corresponding to the battery with the lower voltage can be in the conducting state during this interval. If the first voltage is initially higher than the voltage of the battery with the higher voltage, the battery with the higher voltage may operate in a linear state (e.g., the battery with the higher voltage is not charged with constant current at this moment). Or, the battery with the higher voltage may operate in the linear state first (e.g., the battery with the higher voltage is not charged with constant current at this moment), and then may operate in the conducting state (e.g., the battery with the higher voltage is charged with constant current).

If the first voltage is initially lower than the voltage of the battery with the higher voltage at first, the battery with the higher voltage may not operate, but then can operate in the conducting state (e.g., the battery with the higher voltage is charged with constant current), or may not operate first, but then can operate in a linear state (e.g., the battery with the higher voltage is not charged with constant current), or may not operate first, then can operate in a linear state (e.g., the battery with the higher voltage is not charged with constant current), and finally may operate in the conducting state (e.g., at this time, the battery with the higher voltage is charged with constant current). The first voltage can be controlled to be constant, the first current may gradually be decreased, batteries B1 and B2 can be charged in a constant voltage mode, and switching circuits 1 and 2 may operate in a linear state. For example, the first voltage can be equal to the sum of the battery voltage of the lower voltage and the voltage drop across the circuit when the corresponding switching circuit is conducting.

For example, when the first current is constant and the first voltage gradually increases with the voltage of the battery with the lower voltage between batteries B1 and B2, the battery with the lower voltage may operate in a constant current mode. In the interval where the first current is constant and the first voltage gradually increases, the switching circuit corresponding to the battery with the lower voltage may operate in the conducting state during this interval.

If the first voltage is initially higher than the voltage of the battery with the higher voltage, the battery with the higher voltage may operate in a linear state first, the battery with the higher voltage may not be charged with constant current at that time, the battery with the higher voltage can be charged with constant current and its corresponding switching circuit may operate in the conducting state when the voltages of batteries B1 and B2 are not much different (e.g., the voltage difference between batteries B1 and B2 reaches the first threshold). If the voltage of batteries B1 and B2 remain different in the interval where the first current is constant and the first voltage gradually increases (e.g., the voltage difference between batteries B1 and B2 does not reach the first threshold in this interval), then the switching circuit corresponding to the battery with the higher voltage may operate in a linear state in this interval.

If the first voltage is initially lower than the voltage of the battery with the higher voltage, the battery with the higher voltage may not operate first. When the first voltage increases to be greater than the voltage of the battery with the higher voltage, the switching circuit corresponding to the battery with the higher voltage may operate in a linear state. At this time, the battery with the higher voltage may not be charged with constant current. When the voltage of batteries B1 and B2 is not much different (e.g., the voltage difference between batteries B1 and B2 reaches the first threshold), the switching circuit corresponding to the battery with the higher voltage can be in a conducting state, and the battery with the higher voltage can be charged with constant current. If the voltages of batteries B1 and B2 remains different in the interval where the first current is constant and the first voltage gradually increases (e.g., the difference between the voltages of batteries B1 and B2 does not reach the first threshold in this interval), then the switching circuit corresponding to the battery with higher voltage may operate in a linear state after the first voltage increases to be greater than the voltage of the battery with the higher voltage.

Alternatively, the battery with the higher voltage of B1 and B2 may not operate until the voltage of the battery with the lower voltage rises to be not much different from the voltage of the battery with the higher voltage (e.g., the voltage difference between batteries B1 and B2 reaches the first threshold). Also, the switching circuit corresponding to the battery with the higher voltage may operate in a conducting state, and the battery with the higher voltage can be charged with constant current. If the first voltage increases gradually, when the voltage of the battery with the higher voltage reaches the second reference voltage, the first voltage can be controlled to be constant, and batteries B1 and B2 may be charged in a constant voltage mode. Also, switching circuits 1 and 2 may operate in a linear state, and the first and second reference voltages can be the same value, or different values, depending on the particular application.

In the third implementation, main battery Bm and bidirectional buck-boost circuit 3 can be regarded as an output adjustable power supply, and the first voltage and the first current output by bidirectional buck-boost circuit 3 can be the output signals of the output adjustable power supply. Here, bidirectional buck-boost circuit 3 may operate in reverse, and bidirectional buck-boost circuit 3 may operate in a boost or buck state. The first voltage and the first current can be controlled by adjusting the duty ratios of the power switches S1, S2, S3, and S4 in bidirectional buck-boost circuit 3. Furthermore, the duty ratios of the power switch S1, S2, S3, and S4 can be controlled by any voltage control and current control methods. In some approaches, the efficiency of charging batteries B1 and B2 by main battery Bm may be equal to the product of the efficiency of the boost circuit and the efficiency of the linear charging module. In the second implementation, when switching circuit 1 or switching circuit 2 operates in a conducting state, the efficiency of charging batteries B1 and B2 by main battery Bm can be equal to the efficiency of bidirectional buck-boost circuit 3. The charging efficiency of this example is thus higher than such other approaches. When switching circuit 1 or switching circuit 2 operates in a linear state, the charging efficiency of batteries B1 and B2 by main battery Bm can be equal to the product of the efficiency of bidirectional buck-boost circuit 3 and the efficiency of switching circuit 1 or switching circuit 2.

In the second implementation, switching circuit 1 or switching circuit 2 may operate in the conducting state for a period of time and in the linear state for another period of time, such that the charging efficiency of charging batteries B1 and B2 by main battery Bm is higher in the second implementation then another approach is. In addition, the second implementation can include a constant current charging process to perform fast charging. Further, the charging rate of charging batteries B1 and B2 by main battery Bm can be higher in the third implementation than in other approaches.

In this example, switching circuit 1 can include power switch SR, and switching circuit 2 can include power switch SL. Optionally, power switch Sm can be coupled between the second terminal of bidirectional buck-boost circuit 3 and main battery Bm, in order to prevent the main battery from being overcharged due to excessive charging current or battery capacity. For example, when the voltage of main battery Bm is greater than the first threshold voltage, power switch Sm can be turned off. Alternatively, input terminal IN can be coupled to power switch Sin, which can be conducting when an external power supply is connected, and may be turned off when there is no external power supply, in order to prevent the output signal of the bidirectional buck-boost circuit from flowing back to the first input terminal when main battery Bm charges batteries B1 and B2 without an external power supply, such that the first input terminal has a signal output.

Furthermore, particular embodiments may also provide an integrated circuit (chip) 01. Based on the charging circuit mentioned above, switching circuits 1 and 2, and the power switches in bidirectional buck-boost circuit 3 can be integrated in the same integrated circuit. In this particular example, power switches Sin, SR, SL, S1, S2, S3, S4, and Sm may be integrated in the same integrated circuit. In addition, integrated circuit 01 can include input terminal port IN for receiving input signals output by a wired power supply or a wireless power supply. Integrated circuit 01 can also include output ports BATR, BATL, and BATM for respectively coupling to battery B1, battery B2, and main battery Bm.

Figure 3:
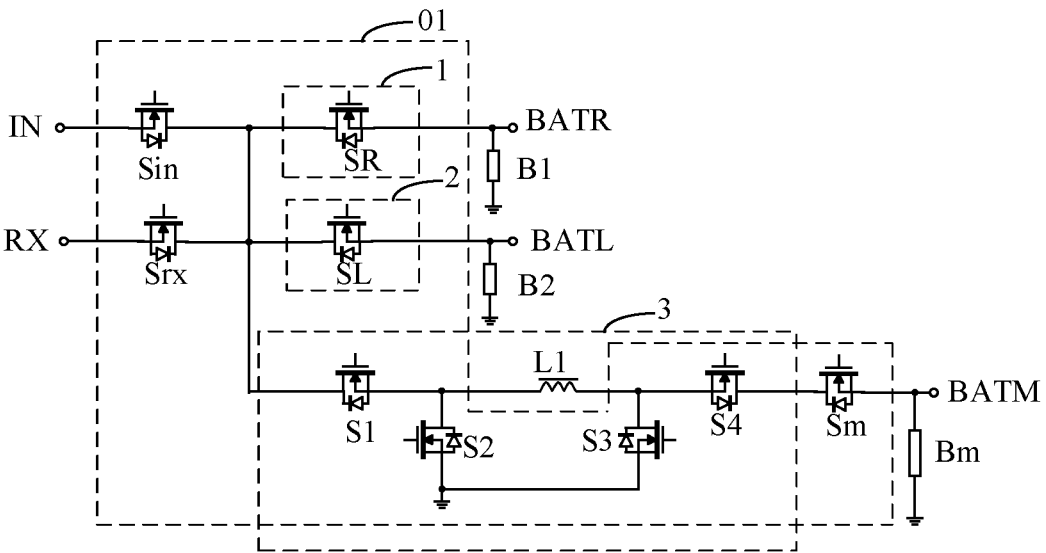
FIG. 3 is a schematic circuit diagram of a second example charging circuit, in accordance with embodiments of the present invention.

Referring now to FIG. 3, shown is a schematic circuit diagram of a second example charging circuit, in accordance with embodiments of the present invention. In this particular example, the charging circuit can include input terminals IN and RX. Input terminal IN may receive the input signal output by the wired power supply, and input terminal RX may receive the input signal output by the wireless power supply. Input terminals IN and RX may respectively be coupled with the switch transistor Sin and switch transistor Srx, for preventing input terminals IN and RX from outputting signals.

For example, power switch Sin can be turned on when an external wired power supply is connected, and may be turned off when the wired power supply is not connected. When a wireless power supply is connected, power switch Srx can be turned on. Power switch Srx can be turned off to prevent signal flow between input terminals IN and RX, and to prevent the output signal of the bidirectional buck-boost circuit from flowing back to input terminal IN or input terminal RX when main battery Bm charges batteries B1 and B2 without an external power supply. In this example, integrated circuit 01 can include input terminal ports IN and input port RX. Input terminal port IN may receive an input signal output by a wired power supply, and input port RX may receive the input signal output by the wireless power supply.

The charging circuit of particular embodiments may have a single-inductor, multiple-output (SIMO) structure, and only one integrated circuit or chip may be required to implement the functionality, while other approaches may require four chips. Further, only one inductor is needed in certain embodiments, which may reduce the volume and cost of the circuit. In addition, according to the charging circuit, the charging efficiency and charging rate of various charging processes (e.g., including charging batteries B1 and B2 when an external power supply is connected, charging main battery Bm and charging batteries B1 and B2 by main battery Bm) can be improved versus other approaches. The system heat dissipation can also be optimized, the service life of the main battery may be prolonged, and the associated costs reduced. As compared with other approaches, the main battery in particular embodiments may have better efficiency in charging batteries B1 and B2, thus prolonging the service time of the main battery. Under the condition that the capacity of the main battery is the same, the main battery of the particular embodiments can charge batteries B1 and B2 in more charging cycles after the main battery is fully charged.

In addition, the charging circuit of the present disclosure may have two independent outputs, and can charge two independent batteries. When the charging circuit of particular embodiments charges an earphone (e.g., a TWS earphone), batteries B1 and B2 can be separately located in the left and right earplugs of the earphone, and main battery Bm can be located in the battery box. Further, the charging circuit of particular embodiments can also be used in other devices. The charging circuit of particular embodiments may be applied to charge independent dual batteries, and the first and second batteries can be located at two different terminals (e.g., the left and right earplugs of a headset), or at the same terminal. That is, the capacity of batteries B1 and B2 may be substantially different. For example, the capacity of one battery in one terminal can be about 100 mAh, and the capacity of the other battery can be about 50 mAh.

In particular embodiments, the power switches can include any suitable electrically controllable switching devices, such as metal-oxide-semiconductor field-effect transistors (MOSFET), bipolar-junction transistors (BJT), or insulated-gate bipolar transistor (IGBT). The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A charging circuit, comprising:
   a) a first input terminal for receiving an input signal;
   b) a first switching circuit comprising a first power switch, and being coupled between the first input terminal and a first battery;
   c) a second switching circuit comprising a second power switch, and being coupled between the first input terminal and a second battery;
   d) a bidirectional buck-boost circuit having only one inductor, and having a first terminal coupled to the first input terminal, the first battery, and the second battery, and having a second terminal coupled to a main battery;
   e) wherein when an external power supply is connected to the first input terminal, the input signal respectively charges the first battery and the second battery through the first and second switching circuits, and charges the main battery through the bidirectional buck-boost circuit;

f) wherein when an external power supply is not connected to the first input terminal, the main battery charges the first battery through the bidirectional buck-boost circuit and the first switching circuit, and charges the second battery through the bidirectional buck-boost circuit and the second switching circuit;
   g) wherein a charging path from the first input terminal to the first battery does not pass through the bidirectional buck-boost circuit, and a charging path from the first input terminal to the second battery does not pass through the bidirectional buck-boost circuit;
   h) wherein a charging path from the first input terminal to the main battery passes through the bidirectional buck-boost circuit, and at such time, the bidirectional buck-boost circuit operates in a forward direction, and a current flowing through the bidirectional buck-boost circuit flows from the first terminal to the second terminal; and
   i) wherein a charging path from the main battery to the first battery passes through the bidirectional buck-boost circuit, a charging path from the main battery to the second battery passes through the bidirectional buck-boost circuit, at such time, the bidirectional buck-boost circuit operates in a reverse direction, and a current flowing through the bidirectional buck-boost circuit flows from the second terminal to the first terminal.

2. The charging circuit of claim 1, wherein:
   a) when the main battery is charged, the bidirectional buck-boost circuit operates in a forward direction; and
   b) when the main battery is discharged, the bidirectional buck-boost circuit operates in a reverse direction.

3. The charging circuit of claim 1, wherein when an external power supply is not connected, the main battery charges the first and second batteries in a time-sharing manner through the bidirectional buck-boost circuit.

4. The charging circuit of claim 1, wherein when an external power supply is not connected, the main battery charges the first battery in a switching cycle, and charges the second battery in the next switching cycle through the bidirectional buck-boost circuit.

5. The charging circuit of claim 1, wherein:
   a) the bidirectional buck-boost circuit comprises an inductor;
   b) when no external power supply is connected, the main battery stores energy for the inductor for a first part of a present switching cycle, the first switching circuit operates in a conducting state for a second part of the present switching cycle, and the inductor releases energy to charge the first battery;
   c) during a first part of a next switching cycle, the main battery stores energy for the inductor; and
   d) during a second part of the next switching cycle, the second switching circuit operates in a conducting state, and the inductor releases energy to charge the second battery.

6. The charging circuit of claim 1, wherein:
   a) during a charging state, the first battery and/or the second battery are charged in a constant current mode first for fast charging; and
   b) when the voltage of the first battery and/or the second battery reaches the corresponding reference voltage, the first and second batteries are charged in a constant voltage mode.

7. The charging circuit of claim 6, wherein:

a) when a charging current is constant and a charging voltage gradually increases, the first battery and/or the second battery are charged in the constant current mode; and b) when the charging voltage is constant, the first and second batteries are charged in the constant voltage mode.

8. The charging circuit of claim 7, wherein when the first battery and/or the second battery are charged in the constant current mode, the charging voltage increases with the voltage of the first battery or the second battery.

9. The charging circuit of claim 6, wherein:

a) when no external power supply is connected, the second terminal of the bidirectional buck-boost circuit receives a voltage of the main battery, and generates a first voltage and a first current at a first terminal of the bidirectional buck-boost circuit by controlling operation states of the bidirectional buck-boost circuit; and b) the first voltage and the first current are respectively used as the charging voltage and charging current to charge the first and second batteries.

10. The charging circuit of claim 6, wherein when an external power source is connected, the input signal comprising an input voltage and an input current are used as the charging voltage and the charging current to charge the first and second batteries.

11. The charging circuit of claim 6, wherein when the charging current is constant and the charging voltage increases gradually, the first and second batteries are charged in the constant current mode, and the first and second switching circuits operate in a conducting state.

12. The charging circuit of claim 6, wherein when the charging current is constant and the charging voltage gradually increases, the first and second batteries are charged in the constant current mode, the switching circuit corresponding to the battery with a higher voltage between the first and second batteries is in a conducting state, and the switching circuit corresponding to the battery with a lower voltage between the first and second batteries operates in a linear state, or in the linear state first and then in the conducting state.

13. The charging circuit of claim 6, wherein when the charging current is constant and the charging voltage increases gradually, the battery with a lower voltage between the first and second batteries is charged in the constant current mode, the switching circuit corresponding to the battery with the lower voltage between the first and second batteries is in a conducting state, and the switching circuit corresponding to the battery with a higher voltage between the first and second batteries does not operate first and then operates in a linear state, or does not operate first and then operates in the conducting state, or does not operate first, then operates in the linear state, and finally operates in the conducting state.

14. The charging circuit of claim 6, wherein when the charging current is constant and the charging voltage increases gradually, the battery with a lower voltage between the first and second batteries is charged in the constant current mode, the switching circuit corresponding to the battery with the lower voltage between the first and second batteries is in a conducting state, and the switching circuit corresponding to the battery with a higher voltage between the first and second batteries operates in a linear state, or operates in the linear state first and then operates in the conducting state.

15. The charging circuit of claim 6, wherein when the charging voltage is constant, the first and second batteries are charged in the constant voltage mode, and the first and second switching circuits both operate in a linear state.

16. The charging circuit of claim 1, wherein when the external power supply is connected, the first and second switching circuits operate in a linear state to respectively charge the first and second batteries.

17. The charging circuit of claim 16, wherein:

a) a voltage of the first battery and a current flowing through the first switching circuit are adjusted by controlling the voltage of a control terminal of the first switching circuit to control resistance of the first switching circuit; and b) a resistance of the second switching circuit is controlled by controlling a voltage at a control terminal of the second switching circuit to adjust a voltage of the second battery and a current flowing through the second switching circuit.

18. The charging circuit of claim 1, further comprising a third switching circuit coupled between a second terminal of the bidirectional buck-boost circuit and the main battery, wherein the third switching circuit is configured to prevent the main battery from being overcharged due to excessive charging current or battery capacity.

19. The charging circuit of claim 1, further comprising a second input terminal, wherein the first input terminal is used for receiving an input signal output by a wired power supply, and the second input terminal is used for receiving an input signal output by a wireless power supply.

20. The charging circuit of claim 18, wherein the first switching circuit, the second switching circuit, the third switching circuit, and power switches in the bidirectional buck-boost circuit are integrated in a same integrated circuit.

* * * * *